US012689786B2

(12) United States Patent
Kim

(10) Patent No.: US 12,689,786 B2
(45) Date of Patent: Jul. 21, 2026

(54) METHOD, SEVER, AND USER TERMINAL FOR CONTENT RECOMMENDATION BASED ON TRAVEL INFORMATION OF USER

(71) Applicant: KAKAO CORP., Jeju-si (KR)

(72) Inventor: Won Ji Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 26 days.

(21) Appl. No.: 18/522,919

(22) Filed: Nov. 29, 2023

(65) Prior Publication Data

US 2024/0196037 A1 Jun. 13, 2024

(30) Foreign Application Priority Data

Dec. 7, 2022 (KR) ........................ 10-2022-0170139

(51) Int. Cl.
 *H04N 21/45* (2011.01)
 *G06Q 50/40* (2024.01)
 (Continued)

(52) U.S. Cl.
 CPC ......... *H04N 21/2668* (2013.01); *G06Q 50/40* (2024.01); *H04N 21/2393* (2013.01);
 (Continued)

(58) Field of Classification Search
 CPC ......... H04N 21/4524; H04N 21/41407; H04N 21/4826; H04N 21/25841; H04N 21/25891; H04N 21/41422
 See application file for complete search history.

(56) References Cited

U.S. PATENT DOCUMENTS 9,560,159 B1 * 1/2017 Lewis ..................... H04L 67/55
2013/0253833 A1 * 9/2013 Tuukkanen ........... G06F 3/0481
 701/538
 (Continued)

FOREIGN PATENT DOCUMENTS

JP 2021-152717 A 9/2021
KR 10-0967926 B1 7/2010
 (Continued)

OTHER PUBLICATIONS

Office Action received in Korean Patent Application No. 10-2022-0170139 dated Apr. 7, 2025.

*Primary Examiner* — Pinkal R Chokshi
(74) *Attorney, Agent, or Firm* — Knobbe, Martens, Olson & Bear, LLP

(57) ABSTRACT

Proposed is a method in which a server recommends a content based on a travel information of a user. The method may include receiving travel information comprising at least one of route information or destination information from a user terminal. The method may include calculating an estimated travel time for the user based on the travel information, selecting at least one recommended content based on the estimated travel time and user information about the user, and providing information about the at least one recommended content to the user terminal. The method may further include generating travel purpose information of the user based on at least one of the route information, the destination information, the user's travel start time information, and the user's schedule information, and in selecting the at least one recommended content, the server selects the at least one recommended content by further considering the travel purpose information.

20 Claims, 10 Drawing Sheets

(51) Int. Cl.
 *H04N 21/239*   (2011.01)
 *H04N 21/258*   (2011.01)
 *H04N 21/2668*  (2011.01)
 *H04N 21/414*   (2011.01)
 *H04N 21/482*   (2011.01)

(52) U.S. Cl.
 CPC . *H04N 21/25841* (2013.01); *H04N 21/25891*
   (2013.01); *H04N 21/41407* (2013.01); *H04N*
  *21/41422* (2013.01); *H04N 21/4524* (2013.01);
       *H04N 21/4826* (2013.01)

(56)       References Cited

U.S. PATENT DOCUMENTS

| | | | |
|---|---|---|---|
| 2015/0208203 A1* | 7/2015 | Cao ..................... | G06F 16/9537 |
| | | | 455/566 |
| 2016/0360271 A1* | 12/2016 | Magahern ................. | G06F 9/48 |
| 2018/0188054 A1* | 7/2018 | Kennedy ............ | G08G 1/09675 |
| 2019/0057312 A1* | 2/2019 | Li ............................ | G06N 5/01 |
| 2023/0056582 A1* | 2/2023 | Pak ....................... | B60W 40/08 |
| 2024/0251129 A1* | 7/2024 | Sharifi ............... | H04N 21/4524 |

FOREIGN PATENT DOCUMENTS

| | | |
|---|---|---|
| KR | 10-2012-0002102 A | 1/2012 |
| KR | 10-2014-0066269 A | 6/2014 |
| KR | 10-1941246 B1 | 1/2019 |

* cited by examiner

| IDENTIFIER | | LENGTH | PURPOSE-RELATED CHARACTERISTIC INFORMATION | USER INFORMATION | | |
| --- | --- | --- | --- | --- | --- | --- |
| | | | | USER'S PLAYBACK COUNT | USER'S PREFERENCE INFORMATION | REMARKS |
| 01 | A Concert Video | 30m | Music | 1 | Like given | ' |
| 02 | B Competition Program, Episode 7 | 45m | Music | 0 | ' | User has watched episodes 1-6 of the same series |
| 03 | C Drama, Episode 3 | 70m | Drama | 0 | ' | ' |
| 04 | D Korean Pro Baseball Highlights | 5m | Sports | 0 | ' | User has watched various other baseball videos |
| 05 | E World Cup Highlights | 38m | Sports | 3 | Like given | ' |
| 06 | Morning Meditation | 7m 30s | Study | 153 | ' | ' |
| 07 | English Study | 20m | Study | 5 | ' | ' |
| 08 | Today's International Financial News | 8m | News | 6 | Like given | ' |

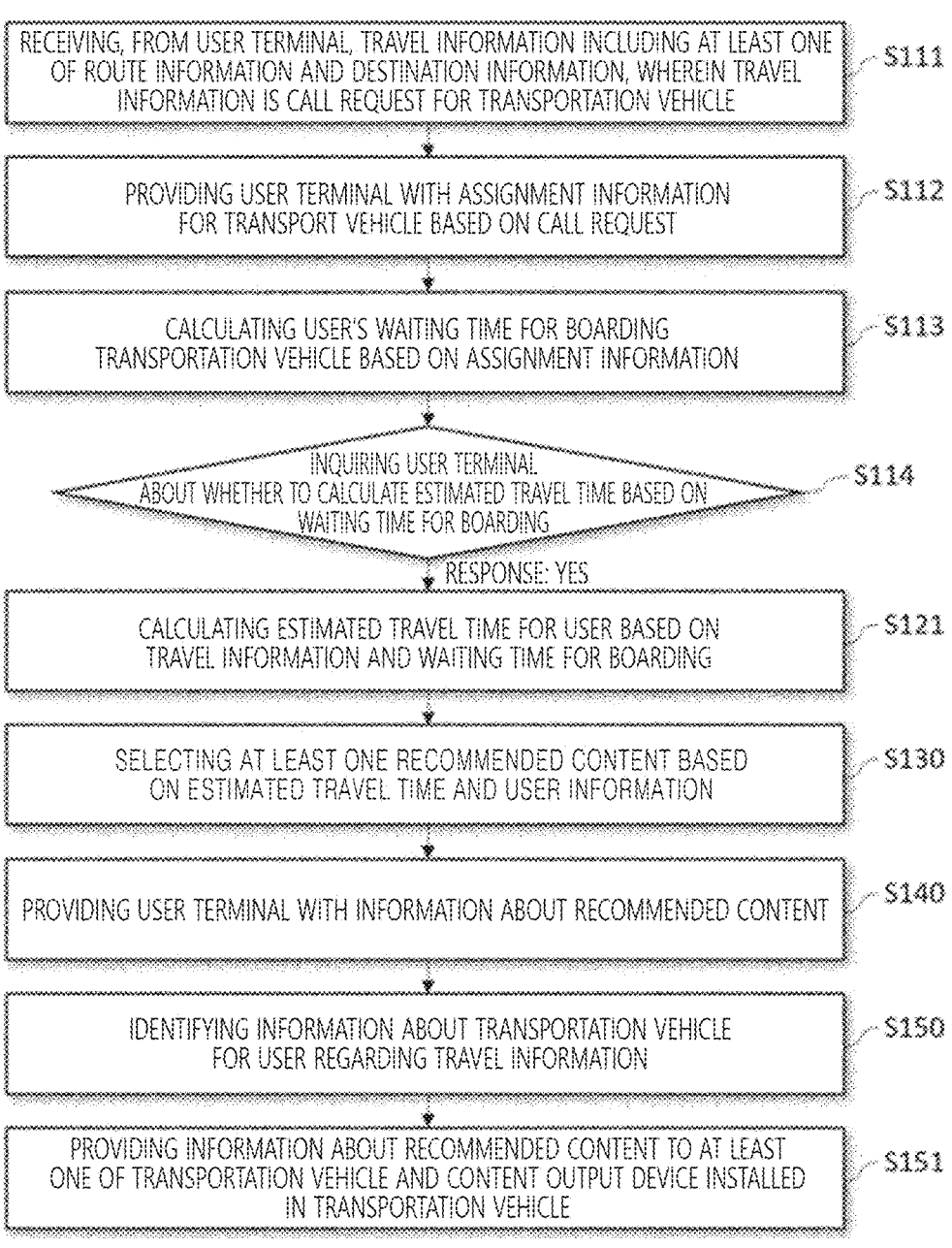

RECEIVING, FROM USER TERMINAL, TRAVEL INFORMATION INCLUDING AT LEAST ONE OF ROUTE INFORMATION AND DESTINATION INFORMATION, WHEREIN TRAVEL INFORMATION IS CALL REQUEST FOR TRANSPORTATION VEHICLE — S111

PROVIDING USER TERMINAL WITH ASSIGNMENT INFORMATION FOR TRANSPORT VEHICLE BASED ON CALL REQUEST — S112

CALCULATING USER'S WAITING TIME FOR BOARDING TRANSPORTATION VEHICLE BASED ON ASSIGNMENT INFORMATION — S113

INQUIRING USER TERMINAL ABOUT WHETHER TO CALCULATE ESTIMATED TRAVEL TIME BASED ON WAITING TIME FOR BOARDING — S114

RESPONSE: YES

CALCULATING ESTIMATED TRAVEL TIME FOR USER BASED ON TRAVEL INFORMATION AND WAITING TIME FOR BOARDING — S121

SELECTING AT LEAST ONE RECOMMENDED CONTENT BASED ON ESTIMATED TRAVEL TIME AND USER INFORMATION — S130

PROVIDING USER TERMINAL WITH INFORMATION ABOUT RECOMMENDED CONTENT — S140

IDENTIFYING INFORMATION ABOUT TRANSPORTATION VEHICLE FOR USER REGARDING TRAVEL INFORMATION — S150

PROVIDING INFORMATION ABOUT RECOMMENDED CONTENT TO AT LEAST ONE OF TRANSPORTATION VEHICLE AND CONTENT OUTPUT DEVICE INSTALLED IN TRANSPORTATION VEHICLE — S151

FIG. 6

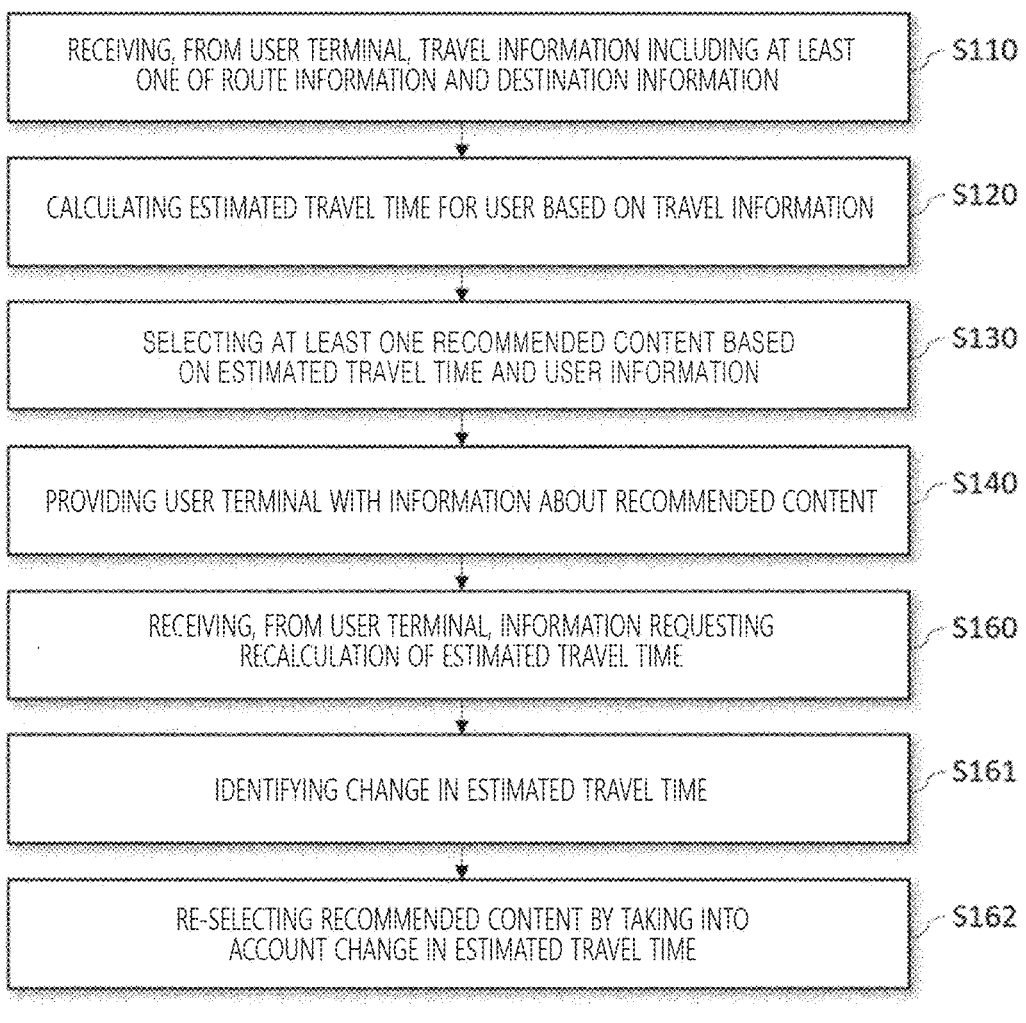

RECEIVING, FROM USER TERMINAL, TRAVEL INFORMATION INCLUDING AT LEAST ONE OF ROUTE INFORMATION AND DESTINATION INFORMATION — S110

CALCULATING ESTIMATED TRAVEL TIME FOR USER BASED ON TRAVEL INFORMATION — S120

SELECTING AT LEAST ONE RECOMMENDED CONTENT BASED ON ESTIMATED TRAVEL TIME AND USER INFORMATION — S130

PROVIDING USER TERMINAL WITH INFORMATION ABOUT RECOMMENDED CONTENT — S140

RECEIVING, FROM USER TERMINAL, INFORMATION REQUESTING RECALCULATION OF ESTIMATED TRAVEL TIME — S160

IDENTIFYING CHANGE IN ESTIMATED TRAVEL TIME — S161

RE-SELECTING RECOMMENDED CONTENT BY TAKING INTO ACCOUNT CHANGE IN ESTIMATED TRAVEL TIME — S162

PROVIDING SERVER WITH TRAVEL INFORMATION INCLUDING AT LEAST ONE OF ROUTE INFORMATION AND DESTINATION INFORMATION — S210

DISPLAYING ESTIMATED TRAVEL TIME CALCULATED BASED ON TRAVEL INFORMATION — S220

DISPLAYING INFORMATION ABOUT CONTENT RECOMMENDED BY SERVER BASED ON ESTIMATED TRAVEL TIME AND USER INFORMATION — S230

PLAYING AND OUTPUTTING RECOMMENDED CONTENT — S240

METHOD, SEVER, AND USER TERMINAL FOR CONTENT RECOMMENDATION BASED ON TRAVEL INFORMATION OF USER

CROSS-REFERENCE TO RELATED APPLICATION

This application claims priority to and the benefit of Korean Patent Application No. 10-2022-0170139 filed on Dec. 7, 2022, the disclosure of which is incorporated herein by reference in its entirety.

BACKGROUND

Technical Field

The present disclosure relates to a method for content recommendation based on travel information of a user using a network.

Description of Related Technology

Due to recent advancements in mobile devices and mobile communication technology, mobility services for calling transportation vehicles, such as taxis, have become widely popular. Mobility services are services that, upon obtaining information from a user, such as the user's current location and destination, assign an appropriate transportation vehicle (e.g., taxis), provide route guidance, and support payment processing.

SUMMARY

The present disclosure provides a method for content recommendation based on travel information of a user.

The present disclosure also provides a method for content recommendation tailored to a user's preference and situation based not only on the user's mobility information but also on the user's travel purpose information.

In one aspect of the present disclosure, there is provided a method in which a server recommends a content based on a travel information of a user, the method including: receiving travel information comprising at least one of route information and destination information from a user terminal; calculating an estimated travel time for the user based on the travel information; selecting at least one recommended content based on the estimated travel time and user information about the user; and providing information about the at least one recommended content to the user terminal.

The method may further include generating travel purpose information of the user based on at least one of the route information, the destination information, the user's travel start time information, and the user's schedule information, and in the selecting of at least one recommended content, the server may select the at least one recommended content by further considering the travel purpose information.

The destination information may include name information specified by the user terminal for the destination information.

The user information may include at least one of the following: the user's content usage history, subscription information, preference information, and preferred content types.

In the selecting of the at least one recommended content, the server may select the at least one recommended content also based on a result of comparison of the estimated travel time with length information of at least one content.

The at least one content may include an interrupted content that is a content which the user watched but didn't complete, and length information of the interrupted content may be remaining length information calculated based on an interrupted point of the interrupted content.

The providing of information about the at least one recommended content may include providing the at least one recommended content to the user terminal in response to a playback request for the recommended content from the user terminal, and when the interrupted content is selected as the at least one recommended content, the server may, in the providing of the at least one recommended content, provide the interrupted content, starting from the interrupted point.

The travel information may include a call request for a transportation vehicle, and the method may further include providing the user terminal with assignment information for the transportation vehicle based on the call request.

The method may further include calculating a waiting time for the user to board the transportation vehicle based on the assignment information, and in the calculating of the estimated travel time, the server may calculate the estimated travel time by further considering the waiting time.

The method may further include: calculating the waiting time for the user to board the transportation vehicle based on the assignment information; and inquiring the user terminal about whether to calculate the estimated travel time by further considering the waiting time, and when a response requesting to calculate the estimated travel time further based on the waiting time for boarding, the server may, in the calculating of the estimated travel time, calculate the expected time by further considering the waiting time for boarding.

The method may further include: identifying a change in the estimated travel time; and re-selecting the at least one recommended content by taking into account the change in the estimated travel time.

The method may further include: prior to identifying the change in the estimated travel time, receiving information requesting recalculation of the estimated travel time based on a current moment from the user terminal, and in the identifying of the change in the estimated travel time, the server may recalculate the estimated travel time based on a current moment and identify the change in the estimated travel time by taking into account a result of the recalculation.

The method may further include: identifying a decrease in the expected lead time; and providing the user terminal with information suggesting a change in a playback speed of the at least one recommended content by taking into account the decrease in the estimated travel time.

The method may further include: identifying information about a transportation vehicle for the user regarding the travel information; and providing information about the at least one recommended content to at least one of the transportation vehicle and a content output device installed in the transportation vehicle.

In another aspect of the present disclosure, there is provided a server for content recommendation based on travel information of a user, the server including: a memory storing instructions, and a processor configured to execute the instructions to: receive travel information comprising at least one of route information and destination information from a user terminal; calculate an estimated travel time for the user based on the travel information; select at least one recommended content based on the estimated travel time and user information about the user; and provide information about the at least one recommended content to the user terminal.

In yet another aspect of the present disclosure, there is provided a method in which a user terminal receives content recommendation based on travel information of a user, the method including: providing travel information comprising at least one of route information and destination information to a server; acquiring an estimated travel time based on the travel information; acquiring information about a recommended content recommended by the server based on the estimated travel time and user information about the user; and displaying the information about the recommended content.

In yet another aspect of the present disclosure, there is provided a user terminal for receiving content recommendation based on travel information of a user, the user terminal including: a memory storing instructions, and a processor configured to execute the instructions to: provide travel information comprising at least one of route information and destination information to a server; display an estimated travel time that is calculated based on the travel information; display information about a content that is recommended by the server based on the estimated travel time and user information about the user; and play and output the recommended content.

BRIEF DESCRIPTION OF THE DRAWINGS

FIG. 4 is an example of content information that a server of the present disclosure refers in order to select recommended content.

FIG. 5 is a flowchart illustrating a method for a server to recommend content based on a user's travel information according to yet another embodiment of the present disclosure.

FIG. 6 is a flowchart illustrating a method for a server to recommend content based on a user's travel information according to yet another embodiment of the present disclosure.

DETAILED DESCRIPTION

Since mobility services are used with a user's mobile communication device, such as a smartphone, it is possible to provide customized services to the user while the user is onboard and traveling within a transportation vehicle assigned to them. However, most of the recent mobility services provide a user onboard a transportation vehicle with current route and location information, or unidirectionally provide content targeting a general audience, rather than offering personalized content for the individual user.

Therefore, there is a growing demand for a method for content recommendation suitable for a user during travel based on the user's mobility information.

Hereinafter, embodiments disclosed in the present specification will be described in detail with reference to the attached drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

In this application, each of the above-described operations may be performed irrespective of the listed order, except for a case where the operations must be performed in the listed order due to a special cause-effect relation of the operations.

It will be further understood that the terms "comprises," "comprising," "includes," "including," "have" and/or "having" when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the attached drawings.

Figure 1:
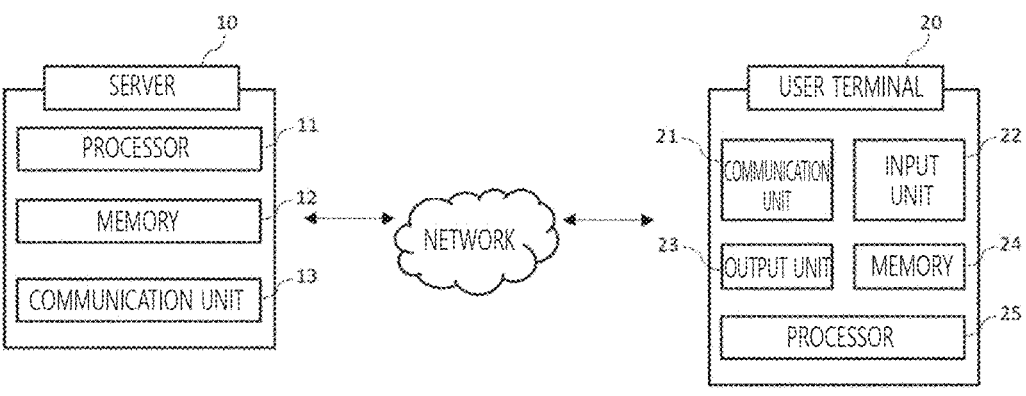
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10 and a user terminal 20.

The server 10 is a device that provides a messenger service to a user terminal. In some cases, the server 10 may be a device that provides a mobility platform service to receive a call for transportation, such as a taxi, from a user and assigns a transportation vehicle. The user terminal 20 is a device that uses a content recommendation service and mobility platform service provided by the server 10.

The content recommendation service is a service where the server 10 recommends a content likely to be preferred by the user based on the user's personal information, environment, history, and preferences. Here, the content may include various types such as videos, music, cartoons, text, and images. Preferably, the content may be output through an electronic device.

In this specification, for convenience of explanation, it is assumed that the server 10 recommends a video content to the user through a content recommendation service. However, this is only for convenience of explanation and the present disclosure is not limited to recommending video content.

The server 10 for performing a content recommendation service may provide a content directly to the user terminal 20. However, in some cases, the user terminal 20 may receive information about a recommended content from the server, but obtain the content itself from a different server 10. In this case, the information about the recommended content provided by the server 10 may include link information to receive the content from the different server 10.

The mobility platform service is a service in which the server 10 assigns a transportation vehicle, such as a taxis, upon a user's request and provides the user's travel information to an operator of the transportation vehicle. Upon receiving a call for transportation from the user, the server 10 may assign a transportation vehicle and provide the user with information such as a waiting time for the transportation vehicle to arrive and an estimated travel time to a destination.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The server 10 may be implemented as a computer device or a plurality of computer devices that provide commands, codes, files, contents, services, and the like. The server 10 may be a server 10 capable of transmitting and receiving information through communication with the user terminal 20 via a network.

The server 10 may include a processor 11, a memory 12, and a communication unit 13.

The processor 11 may control the overall operation of the memory 12 and the communication unit 13 to provide the messenger service to a user terminal.

The memory 12 serves as a storage medium and may store a number of application programs running on the server 10, and data and commands for operation of the server 10. In one embodiment, the memory 12 may store an application associated with a content recommendation service or a mobility platform service (hereinafter referred to as the "application").

The memory 12 may be provided in the form of any of various hardware storage devices such as an ROM, an RAM, a flash drive, a hard drive, etc. or may be provided in the form of web storage.

The communication unit 13 may communicate with a user terminal in a wired or wireless manner through a network.

The server 10 receives, from the user terminal 20, travel information including at least one of route information and destination information, and calculates an estimated travel time for the user based on the travel information. Thereafter, the server 10 selects at least one recommended content based on the estimated travel time and user information, and provides the user terminal 20 with information about the recommended content.

Here, the travel information refers to information about the user traveling along a specific route or to a specific destination. The travel information may include information on the user's time of travel, information on a time required for the travel, information on a cost of the travel, and information on a transportation vehicle, such as a taxi, a car, and a bicycle.

Here, the estimated travel time refers to a time expected to be taken by the user to complete the travel based on the travel information. In some cases, the estimated travel time may include a time for which the user waits until departure if the user is not departing immediately. The estimated travel time is estimated by taking into account the user's transportation vehicle, the distance to the destination, the travel route, traffic conditions, weather conditions, and the like, and therefore may later change to increase or decrease for various reasons.

Here, length information of a content may be defined in various ways depending on the type of the content. For example, if the content is a video or music, length information of the content may be a time required to play the content from beginning to end (running time). If the content is a comic or webtoon, length information of the content may be the number of pages, cuts, or the like. If the content is texts such as a novel or essay, length information of the content may be the number of pages, words, characters, or the like.

However, in this specification, for content types such as comics or novels where there is no separate running time defined, a length of content is primarily used to denote the average time required for a typical content consumer to consume (enjoy) the content.

The user terminal 20 is a user terminal that uses the content recommendation service provided by the server 10. The user terminal 20 may be a user terminal that uses the mobility platform service provided by the server 10. For the server 10, the user terminal 20 may correspond to the user's account. Therefore, when the server 10 transmits and receives information with the user terminal 20 as a counterpart, the counterpart may not be the physical user terminal 20 but the user's account associated with the user terminal 20.

The user terminal 20 may include a communication unit 21, an input unit 22, an output unit 23, a memory 24, and a processor 25.

The communication unit 21 may communicate with the server 10 or other terminals in a wired/wireless manner.

The input unit 22 may receive various information through the user's manipulation and input actions. Such input units may include a touch screen module, a keyboard, a mouse, a button, a camera, a stylus, and a microphone.

The first user terminal 20 may receive a user's interaction through the input unit 22. The interaction refers to the user's action of operating the input unit 22 to input information reflecting the user's selection or intention into the user terminal 20. For example, the interaction may include touching on a touchscreen, clicking with a mouse, typing on a keyboard, providing voice input through a microphone, capturing an image using a camera, recognizing movements through a motion sensor, and the like.

The output unit 23 may output various information. The output unit 23 may be a display device, a speaker, a vibration generator, a tactile generator, etc. In some cases, the output unit 23 may be a device (e.g., Bluetooth earphone) that is connected to the user terminal 20 through wired or wireless communication (e.g., short-range radio communication such as Bluetooth) to receive and output a signal.

The memory 24 serves as a storage medium and may store a plurality of application programs running on a user terminal, and data and instructions for operating the first user terminal 20. This memory may be provided in the form of any of various hardware storage devices such as an ROM, an RAM, a flash drive, a hard drive, etc. or may be provided in the form of web storage. In one embodiment, the memory 24 may store an application (hereinafter referred to as "application") associated with the content recommendation service or the mobility platform service.

The processor 25 may execute an application by controlling the overall operation of the communication unit 21, the input unit 22, the output unit 23, and the memory 24.

The user terminal 20 receives travel information including at least one of route information and destination information from the server 10. Thereafter, the user terminal 20 displays an estimated travel time calculated based on the travel information, displays information about a content that is recommended based on the estimated travel time and user information about the user, and plays the recommended content.

Figure 2:
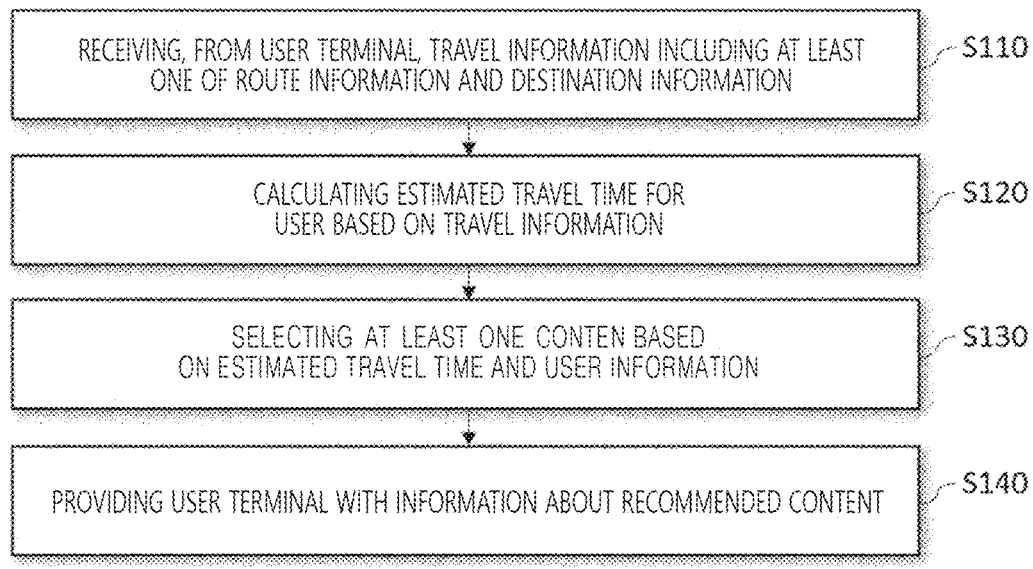
FIG. 2 is a flowchart illustrating a method for a server to recommend content based on a user's travel information according to an embodiment of the present disclosure.

FIG. 2 is a flowchart illustrating a method in which the server 10 recommends a content based on a user's travel information according to an embodiment of the present disclosure.

In operation S110, a server 10 receives travel information from a user terminal 20.

The travel information may include at least one of route information and destination information. The user terminal 20 may provide the server 10 with the travel information using a service for calling a transportation vehicle like a taxi, a map service for searching for a location or place, a navigation service for providing route guidance, or the like.

In operation S120, the server 10 calculates an estimated travel time required for the user based on the travel information.

The server 10 calculates the user's estimated travel time based on the user's transportation vehicle, a distance to a destination, a travel route, traffic conditions, weather conditions, or the like. The estimated travel time refers to a time expected to be taken by the user to complete the travel based on the travel information.

In operation S130, the server 10 selects at least one recommended content based on the estimated travel time and user information.

The server 10 select at least one content suitable for recommendation to the user based on the estimated travel time calculated in operation S120. Specifically, for a content to become a recommended content, it is preferable that the length of the content is the same as or shorter than the estimated travel time. Since the server 10 aims to recommend a content to watch during travel based on the travel information, a length (duration) of the content needs to be shorter than the estimated travel time.

In some cases, the server 10 may set, as a selection criterion for content recommendation, that the length of the content should be shorter by a predetermined amount than the estimated travel time. For example, the server 10 may set, as a selection criterion for content recommendation, that the length of the content is at least 3 minutes shorter than the estimated travel time. This accounts for situations where the estimated travel time may decrease, where the user can perform a task other than watching a content during travel, where the user may require an additional time for paying transportation fees during travel, etc.

If it is difficult to select a content of an appropriate length based on the estimated travel time, the server 10 may also select a combination of two or more contents as a recommended content. For example, if the estimated travel time is 30 minutes, the server 10 may wish to select a content with a maximum length of 27 minutes as a recommended content based on the estimated travel time. In this case, if there is no suitable content with a length of 27 minutes to recommend, the server 10 may select a combination of a 15-minute first content and a 12-minute second content as a recommended content.

If there is an interrupted content which is a content that the user watched but did not complete, the server 10 may select the interrupted content as a candidate for recommended content and compare length information of the interrupted content. This is because the user is likely to prefer resuming the interrupted content. Here, the length information of the interrupted content may be remaining length information calculated based on an interrupted point of playback of the content. In operation S130, the server 10 may derive a result by comparing the estimated travel time and the remaining length information of the interrupted content. For example, let's assume that the estimated travel time is 30 minutes, there is an interrupted content with a total length of 50 minutes, and remaining length information of the interrupted content is 26 minutes. In this case, the server 10 may select the interrupted content as a recommended content.

In this case, when providing the user terminal 20 with the recommended content upon a playback request for the recommended content from the user terminal 20, the server 10 may provide the recommended content starting from an intermediate point based on the point of interruption in playback of the interrupted content.

User information may include at least one of the following: the user's content usage history, subscription information, preference information, and preferred content types. The user information may be information regarding the content service provided by the server 10. In some cases, however, the user information may include not only the content usage history within the server 10 but also the user's content usage history within different servers 10 or services.

The content usage history refers to records of watching or viewing content in various forms. The preference information may include preference information based on the user's existing content usage history, preference information directly input by the user into the server 10, information about a content saved to watch later, information about search queries used to search for contents, and the like.

The user's preferred content types may be information pre-registered on the server 10 based on the user's characteristics and situation. For example, some users may prefer auditory contents over visual contents. In this case, the user may provide information on preferred content types based on the user's preference to the server. A content type may be visual content, auditory content, or mixed content, or the like. In this manner, the method for content recommendation based on a user's preferred content type enables the provision of a customized content to a user with disabilities such as visual or hearing impairment.

In some cases, the content type may be determined by a content play device. For example, if a device used by a user to receive information about a recommended content from the server is suitable for playing videos, the user's preferred content type may be determined to be video. If a user is wearing a headphone or earphones when the user receives information about a recommended content from the server, the user's preferred content type may be determined to include auditory content.

The server 10 may select a recommended content by assigning a weight to a result of comparing length information of a content and user information based on a predetermined weighting condition. The weighting condition may be set by the user separately entering the condition into the server 10 based on the user's preference.

The recommended content may be a plurality of contents. When the recommended content is a plurality of contents, the server 10 may assign priorities to the plurality of recommended contents, so that a content item with higher priority is displayed first or at the top.

In operation S140, the server 10 provides information about the recommended content to the user terminal 20.

The information about the recommended content may include at least one of the following: a title of the recommended content, a list of a plurality of recommended contents, a link to the recommended content, and the recommended content itself. The recommended content itself refers to the content or body of the recommended content. For example, the fact that the recommended content is a video content and the server 10 provides the recommended content to the user terminal 20 means that the user terminal 20 receives the recommended content from the server 10 and plays and outputs the recommended content.

Operation S140 in which the server 10 provides the information about the recommended content to the user terminal 20 may include the following two steps. The first of the two steps is a step in which the server 10 provides list information of recommended contents to the user terminal 20. The user terminal 20 may select at least one output content in response to the provided list information of the recommended contents. The second of the two steps is a step in which the server 10 provides a selected output content to the user terminal 20. However, in some cases, the second step may not be performed directly by the server 10, but may be provided by a separate server 10 that provides contents.

Figure 3:
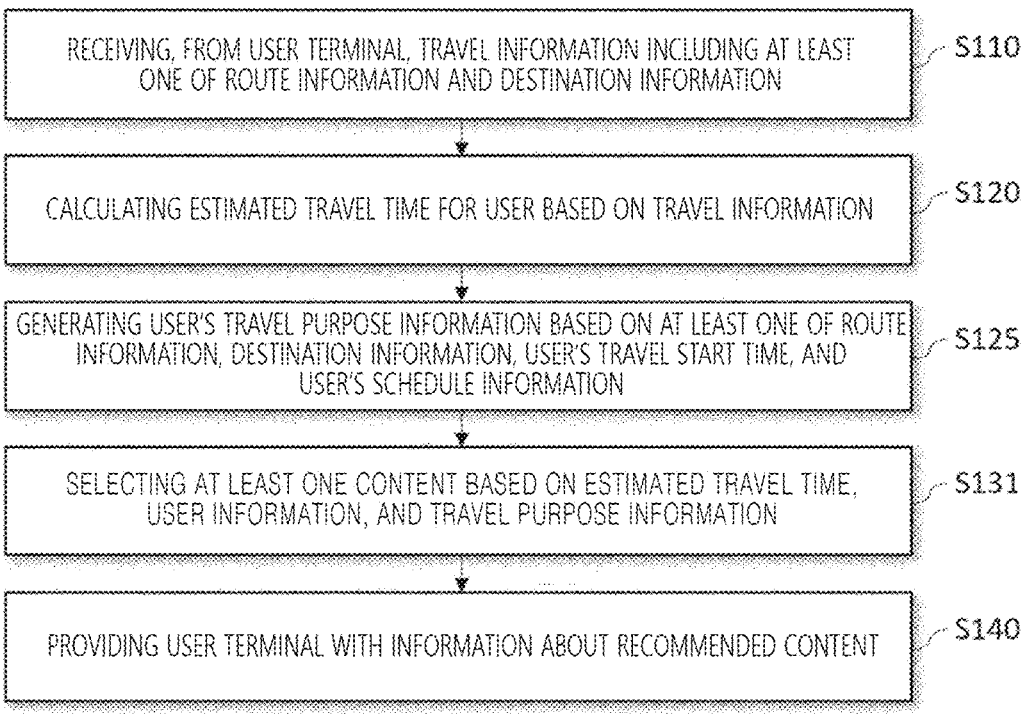
FIG. 3 is a flowchart illustrating a method for a server to recommend content based on a user's travel information according to another embodiment of the present disclosure.

FIG. 3 is a flowchart illustrating a method in which server 10 recommends a content based on a user's travel information according to another embodiment of the present disclosure.

In describing the method for content recommendation based on a user's travel information with reference to FIG. 3, the focus of the explanation will be on the differences from the method described with reference to FIGS. 1 and 2.

The embodiment described in FIG. 3 primarily features the addition of operation S125 and the change from operation S130 to operation S131, compared to the embodiment described in FIG. 2. Other operations in the embodiment illustrated in FIG. 3 are substantially similar to the embodiment illustrated in FIG. 2.

In operation S125, the server 10 generates a user's travel purpose information based on at least one of route information, destination information, the user's travel start time information, and the user's schedule information.

For example, if the destination is "A English Academy," the server 10 may determine the user's travel purpose as "English Study" or "Study" and generate corresponding travel purpose information. Additionally, if the travel start time is 07:00 in the morning and the destination is within a business district, the server 10 may determine the user's travel purpose as "commuting" and generate corresponding travel purpose information.

When generating the user's travel purpose information based on destination information, the server 10 may reference and use name information specified by the user terminal 20 for the destination information. The name information specified by the user terminal 20 for the destination information does not refer to an address of a frequently visited destination but rather to familiar names like "Home" and "Work."

For example, if name information of a starting point is a place specified as "Work" and name information of a destination is a place specified as "Home," the server 10 may determine the user's travel purpose as "Commuting Back Home" and generate corresponding travel purpose information.

In some cases, the server 10 may acquire the user's schedule information and generate travel purpose information based on the schedule information. For example, let's assume that the server 10 has acquired information indicating that the user has a scheduled "Golf Round" at 10 AM today. In this case, when the server 10 receives travel information indicating that the user is departing at 8:30 AM, the server 10 may determine the user's travel purpose as "Exercise" and generate corresponding travel purpose information.

In operation S131, the server 10 selects at least one recommended content based on the estimated travel time, the user information, and the travel purpose information.

Compared to operation S130, operation S131 is characterized in that the recommended content is selected by also considering the travel purpose information. In order to select a recommended content, the server 10 may consider not only the user information and the estimated travel time, but also the travel purpose information.

The server 10 may select a recommended content by assigning weights to the result of comparing length information, the user information, and the travel purpose information based on a predetermined weighting condition. The weighting condition may be set by the user separately entering the condition into the server 10 based on the user's preference.

FIG. 4 is an example of content information referenced by the server 10 according to the present disclosure to select recommended content.

As an example, let's assume that in operation S120, the server 10 calculates an estimated travel time for a user as 9 minutes and 30 seconds based on travel information. Also, let's us assume that in operation S130, the server 10 generates the user's travel purpose information as "Study" based on the destination information, which is "A Prep School."

In this situation, when the server 10 selects a recommended content from a plurality of contents shown in FIG. 4, it may be preferable to select a content with identifier 06 as the recommended content. The content with identifier 06 has a length of 7 minutes and 30 seconds, which is 2 minutes shorter than the estimated travel time of 9 minutes and 30 seconds. In addition, the content with identifier 06 has a purpose-related characteristic as "Study" which matches the travel purpose information. Also, the fact that the content with identifier 06 has been played by the user 153 times, considering user information, indicates that the content is a preferred content for the user. Therefore, the server 10 may provide the content with identifier 06 to the user terminal 20 as a recommended content.

As another example, let's assume that in operation S120, the server 10 calculates an estimated travel time for the user as 50 minutes based on travel information. Also, let's assume that, in operation S130, the server 10 attempts to estimate the user's travel purpose based on route information, destination information, the user's travel start time information, and the user's schedule information but fails to make an estimation and generates travel purpose information as "Unknown."

In this situation, when the server 10 selects a recommended content from the plurality of contents shown in FIG.

4, it may be preferable to select the content with identifier 02 as the top-priority recommended content and a combination of contents with identifiers 04 and 05 as the second-priority recommended content.

The content with identifier 02 has a length of 45 minutes, which is 5 minutes shorter than the estimated travel time of 50 minutes, and there is a user history indicating that the user has previously watched episodes 1 to 6 of the same series. This history may be considered as a positive factor in selecting the content with identifier 02 as a recommended content item. Since the server 10 has generated the travel purpose information as "Unknown", the server 10 may assign a low weight to the travel purpose information when selecting a recommended content item. Consequently, purpose-related characteristic of "Music" associated with the identifier 02 may be considered with a lower weight.

As for the identifiers 04 and 05, a combined length of the contents with identifiers 04 and 05 is 43 minutes, which is 7 minutes shorter than the estimated travel time of 50 minutes, and there is a user history of watching various other baseball videos. This history may be considered as a positive factor in selecting the content with identifier 04 as a recommended content item. Since the server 10 has generated the user's travel purpose information as "Unknown," the server 10 may assign a low weight to the travel purpose information when selecting a recommended content item. Consequently, purpose-related characteristic of "sports" associated with identifier 02 may be considered with lower weight.

The server 10 may determine priorities of recommended contents by comprehensively taking into account details of identifier 02 and the combination of identifiers 04 and 05. If the priority of identifier 02 is determined to be higher, the content with the identifier 02 may be selected as the top-priority recommended content, and the content with the combination of identifiers 04 and 05 may be selected as the second-priority recommended content.

On the other hand, a content with identifier 03, having a length longer than the estimated travel time and lacking additional positive user information, is likely to be less prioritized for recommendation, compared to identifier 02 or the combination of identifiers 04 and 05.

FIG. 5 is a flowchart illustrating a method in which the server 10 recommend a content based on a user's travel information according to yet another embodiment of the present disclosure.

In describing the method for content recommendation based on user's travel information with reference to FIG. 5, the focus of the explanation will be on the differences from the method described with reference to FIGS. 1 and 2.

The embodiment described in FIG. 5 primarily features the addition of operations S112, S113, S114, S150, and S151, as well as the change from operations S110 and S120 to operations S111 and S121, compared to the embodiment described in FIG. 2. Other operations in the embodiment shown in FIG. 5 are substantially similar to the embodiment illustrated in FIG. 2.

In operation S111, the travel information received by the server 10 may include a call request for a transportation vehicle.

Here, the transportation vehicle may be a rental transportation vehicle, such as a taxi, carpool vehicle, or rental car, or may be a public transportation vehicle such as a bus or subway. The user terminal 20 may specify a type of at least one transportation vehicle and provide the server 10 with a call request for the transportation vehicle. For example, the user terminal 20 may provide the server 10 with a call request for a taxi to reach a specific destination.

A call request for a transportation vehicle may refer to calling the transportation vehicle to the user's location or designated location. When a user calls for a rental transportation vehicle such as a taxi, carpool vehicle, or rental car, it may imply that the user requests an additional journey, stop, or ride-sharing that is not originally scheduled for the transportation vehicle. On the other hand, when a user calls for a public transportation vehicle such as a bus or subway, it may imply the user boards the public transportation vehicle that arrives at the user's location or designated location.

In operation S112, the server 10 provides the user terminal 20 with assignment information for the transportation vehicle based on the call request.

The server 10 analyzes the user's call request and assigns an appropriate transportation vehicle to the user. The assigned transportation vehicle travels to a location where the user is located or to a location designated by the user. When the assignment of the transportation vehicle to the user is completed, the server 10 may provide the assignment information for the transportation vehicle to the user terminal 20.

In operation S113, the server 10 calculates the user's waiting time for boarding the transportation vehicle based on the assignment information.

The user's waiting time for boarding the transportation vehicle refers to an expected time for the user to board the assigned transportation vehicle and depart. Specifically, the waiting time for boarding may refer to a time it takes for the assigned transportation vehicle to reach the user's location or a designated location. In some cases, if the user requires additional time to reach the designated location after the transportation vehicle has arrived at the user's location, the waiting time for boarding may include the additional time.

In operation S114, the server 10 inquires the user terminal 20 about whether to calculate an estimated travel time based on the waiting time for boarding.

The waiting time for boarding, calculated in operation S113, may be factored into the estimated travel time. However, the user may decide whether to factor the waiting time into the estimated travel time and receive a recommended content based on the estimated travel time. Therefore, in operation S114, the server 10 may inquire the user terminal 20 about whether to request content recommendation based on the waiting time for boarding.

If a positive response (a request to calculate the estimated travel time by further considering the waiting time for boarding) is received in response to the inquiry, operation S121 is performed subsequently.

On the other hand, if a negative response (a request not to calculate the estimated travel time by further considering the waiting time for boarding) is received in response to the inquiry, the estimated travel time is calculated without considering the waiting time for boarding. This may correspond to substantially the same process as operation S120 of FIG. 2.

In operation S121, the server 10 calculates the estimated travel time for the user based on the travel information and the waiting time for boarding.

This differs from the operation S120 described in FIG. 2, where the estimated travel time for the user is calculated based on the travel information, in that the estimated travel time is calculated by further considering the waiting time for boarding.

This means that a content with an appropriate length will be recommended considering that the user receives and watches a recommended content even while waiting to board the transportation vehicle. For example, there may be a case where an expected time to reach a destination is 20 minutes, while a time expected for a taxi, which is a transportation vehicle, to reach the user's location (waiting time for boarding) is 15 minutes. In this case, the server 10 may determine an estimated travel time to be 35 minutes (20 minutes+15 minutes) and provide a recommended content based on the estimated travel time. This is because the user can watch a content while waiting to board.

In operation S150, the server 10 identifies information about the user's transportation vehicle regarding the travel information.

Although operation S150 is performed after operation S140 in FIG. 5, operation S150 may be performed at any time after assignment information is generated in operation S112. In this case, the transportation vehicle may be a transportation vehicle that the user has not yet boarded but is expected to board.

In operation S151, the server 10 provides information about a recommended content to at least one of the transportation vehicle and a content output device installed in the transportation vehicle.

In some cases, the transportation vehicle may include a content output device capable of outputting contents, or there may be a content output device not included in the transportation vehicle but installed separately. The content output device may be, for example, a tablet computer device installed in a taxi and capable of displaying images. The server 10 provides information about a recommended content to at least one of the transportation vehicle and the content output device installed in the transportation vehicle.

Here, providing the information about the recommended content may imply providing the information so that the recommended content is played and output through the content output device. Accordingly, the user can watch the recommended content through the user terminal 20 or, in some cases, through a separate content output device included in or installed in the transportation vehicle.

Whether to output the recommended content through the user terminal 20 or a separate content output device may be determined by the user's providing selection information to the server 10.

FIG. 6 is a flowchart illustrating a method in which the server 10 recommends a content based on a user's travel information according to yet another embodiment of the present disclosure.

In describing the method for content recommendation based on user's travel information with reference to FIG. 6, the focus of the explanation will be on the differences from the method described with reference to FIGS. 1 and 2.

The embodiment described in FIG. 6 primarily features the addition of operations S160, S161, and S162, compared to the embodiment described in FIG. 2. Other operations in the embodiment shown in FIG. 5 are substantially similar to the embodiment illustrated in FIG. 2.

In operation S160, the server 10 receives information requesting recalculation of the estimated travel time from the user terminal 20.

The users may request the recalculation of the estimated travel time for various reasons. For example, the user may not start playing a recommended content even after a predetermined time has passed after boarding a transportation vehicle. In this case, part of the estimated time has already passed, so even if the user starts playing the content late, the content may not be completed before arrival.

In this case, the user may request the server 10 to recalculate the estimated travel time based on a current moment to recommend a content again based on the recalculated estimated travel time.

In operation S161, the server 10 identifies a change in the estimated travel time.

In FIG. 6, the user requests recalculation of the estimated travel time in operation S160, and the server 10 recalculates the estimated travel time to identify a change in subsequent operation S161. In some cases, however, operation S160 may be omitted.

The estimated travel time may change without the user's request for recalculation. Specifically, the estimated travel time may change depending on traffic conditions of a travel route and characteristics of the transportation vehicle. For example, if traffic congestion on a travel route eases faster than expected, the estimated travel time may change to decrease. In this case, the server 10 may identify the change in the estimated travel time in operation S161 even without operation S160. Conversely, if traffic congestion on the travel route is worse than expected or an unexpected event such as a traffic accident occurs, the estimated travel time may change to increase.

In operation S162, the server 10 re-selects a recommended content based on the change in estimated travel time.

The example below will be explained with reference to a list of contents described in the table of FIG. 4.

As an example, let's assume that the estimated travel time is initially calculated as 50 minutes, and the content with identifier 02, which is 45 minutes long, is selected as a recommended content and provided to the user terminal 20. However, if the user has not started playing the content even after 10 minutes since departure for various reasons, it may be challenging to complete the entire content with identifier 02 before reaching the destination.

In this case, the server 10 may receive, from the user, information requesting recalculation of the estimated travel time in operation S160, and identify that the estimated travel time has changed from 50 minutes to 40 minutes at a current moment in operation S161. Based on the change in the estimated travel time, the server 10 may cancel the previous selection of the content with identifier 02 as a recommended content, and instead, re-select a content with identifier 01 (having a length of 30 minutes) or a content with identifier 05 (having a length of 38 minutes) shown in FIG. 3 as a recommended content in operation S162. Here, given that the purpose-related characteristic information of the content with identifier 02 is music, it may be preferable to re-select the content with identifier 01, which has the same purpose-related characteristic information as that of the content with identifier 02, as a recommended content.

As another example, let's assume that the estimated travel time is initially calculated as 40 minutes, and the content with identifier 05, which has a length of 38 minutes, is selected as a recommended content and provided to the user terminal 20. Then, the user immediately starts playing the content with identifier 05 upon departure, so after 18 minutes from departure, the content with identifier 05 may have 20 minutes remaining.

Let's assume that, after 18 minutes from departure, the server 10 identifies a decrease in the estimated travel time due to unexpected rapid relief of traffic congestion in operation S161. Specifically, as 18 minutes have passed from the initial estimated travel time of 40 minutes, the estimated travel time at the current moment should be 22 minutes according to the original estimate. However, the server 10 may identify that the estimated travel time has decreased by 4 minutes, resulting in an estimated travel time of 18 minutes.

In this case, even if the user watches the remaining content with identifier 05 (having a length of 20 minutes) for the remaining estimated time of 18 minutes, the user cannot finish watching the entire content with identifier 05. In this situation, in order to ensure that the user can complete watching the content currently in progress before reaching the destination, the server 10 may suggest changing the playback speed of the content with identifier 05 from the original 1.0×playback speed to 1.2×playback speed, for example. If the user accepts the suggestion and starts watching the remaining content with identifier 05 at 1.2×playback from the current moment, the watching time may be approximately 16.67 minutes (20 minutes/1.2×playback), allowing the user to finish watching the content in progress within the changed estimated travel time of 18 minutes.

Hereinafter, an example of a screen displayed on the user terminal 20 as a result of a method for content recommendation based on a user's travel information according to the present disclosure will be described with reference to FIGS. 7 to 10.

Figure 7:
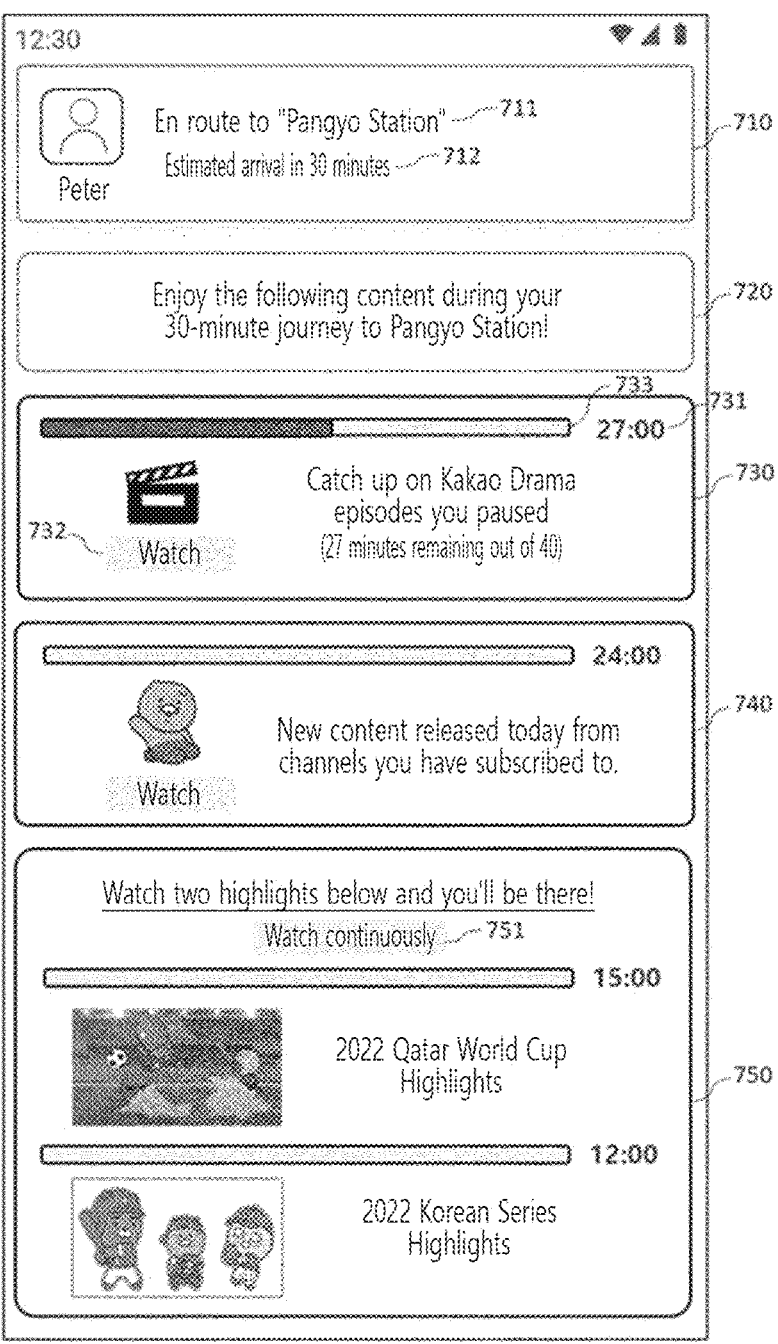
FIG. 7 shows an example of a screen on which a service for content recommendation based on a user's travel information is displayed according to an embodiment of the present disclosure.

FIG. 7 shows an example of a screen on which a service for content recommendation based on a user's travel information is displayed according to an embodiment of the present disclosure.

Referring to FIG. 7, travel information 710 is displayed on a user terminal 20. The travel information 710 may include destination information 711 and information 712 on an estimated travel time. The user terminal 20 may display a guidance message 720 that recommends a content based on the estimated travel time. The guidance message 720 may suggest watching a recommended content below during the calculated estimated travel time (30 minutes).

Referring to FIG. 7, three recommended items are displayed.

A first recommended content 730 may be an interrupted content that the user has watched but did not finish. Information about the first recommended content 730 may include a required watching time 731 and information 733 indicating the paused status of the content and the remaining time for the content. In addition, there is a "Watch" interface 732 for watching the first recommended content.

A second recommended content 740 is an example of a recommended content selected based on user information. The second recommended content may be selected as a recommended content based on the user's subscribed channel information.

A third recommended content 750 is an example of a combination of two contents recommended. A third recommended content includes two different contents, and there is an interface 751 that allows the user to watch two videos in succession.

Figure 8:
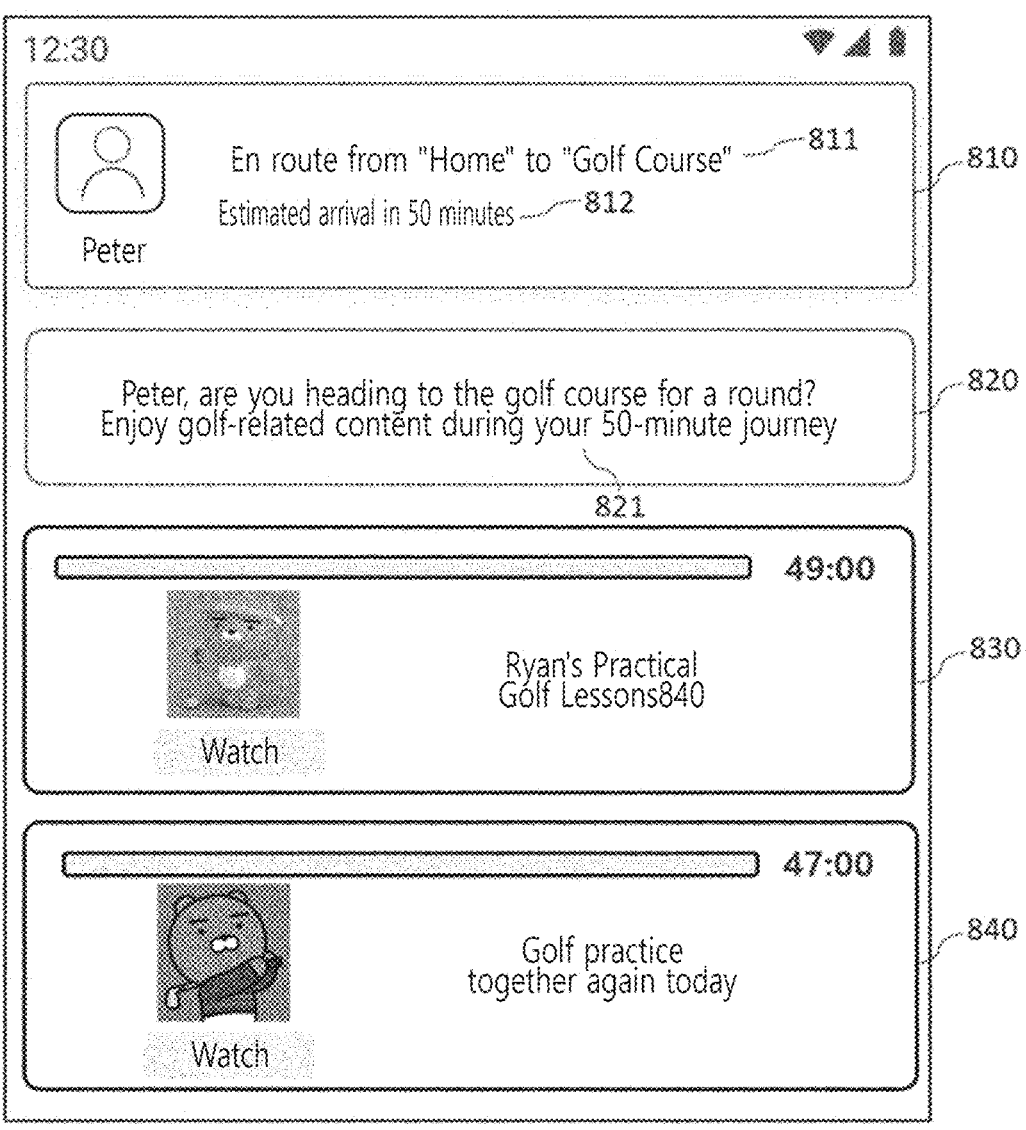
FIG. 8 shows an example of a screen on which a service recommending content is displayed in consideration of a user's travel purpose according to an embodiment of the present disclosure.

FIG. 8 shows an example of a screen on which a service for content recommendations is displayed based on a user's travel purpose information according to an embodiment of the present disclosure.

Referring to FIG. 8, travel information 810 is displayed on a user terminal 20. The travel information 810 may include departure and destination information 811 and information 812 about an estimated travel time. The user terminal 20 may display a guidance message 820 that recommends a content based on the estimated travel time and travel purpose information 821. The guidance message 820 may suggest watching "golf content" that matches the travel purpose information during the calculated estimated travel time (50 minutes).

Referring to FIG. 8, recommended contents 830 and 840 related to golf, which can be fully watched within the estimated travel time of 50 minutes, are displayed.

Figure 9:
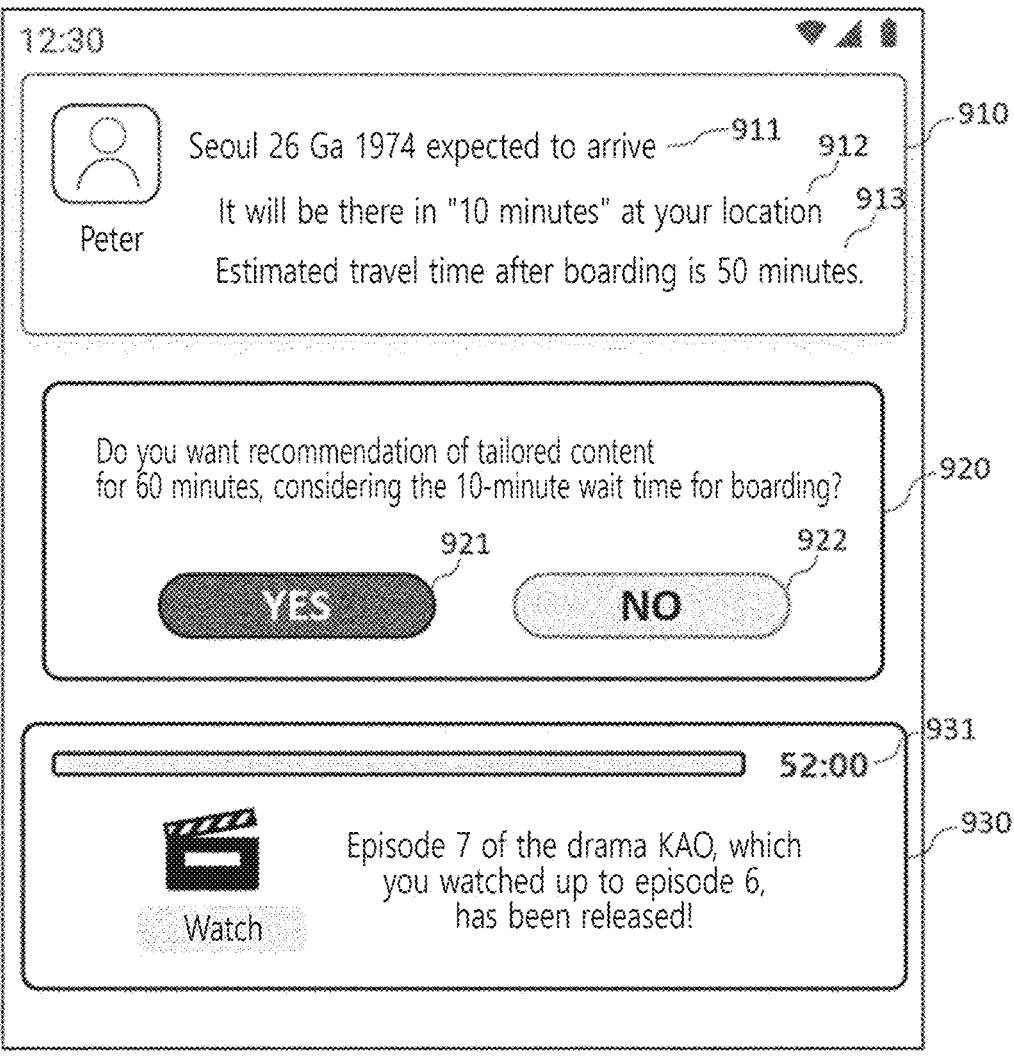
FIG. 9 shows an example of a screen on which a content recommendation message is provided by taking into account waiting time for boarding in an estimated travel time according to an embodiment of the present disclosure.

FIG. 9 shows an example of a screen on which a content recommendation message is provided by taking into account waiting time for boarding in an estimated travel time according to an embodiment of the present disclosure.

Referring to FIG. 9, travel information 910 is displayed on a user terminal 20. The travel information 910 may include transportation vehicle assignment information 911, information 912 about a waiting time for boarding a transportation vehicle, and information 913 about a travel time to a destination.

Referring to FIG. 9, a message 920 inquiring whether to calculate an estimated travel time by further considering a waiting time for boarding (10 minutes) may be displayed, along with response interfaces 921 and 922.

Referring to FIG. 9, a response 921, requesting content recommendation based on the waiting time for boarding (10 minutes) in addition to a travel time (50 minutes), is selected. As a result, the estimated travel time is calculated as 60 minutes and a recommended content 930 is selected accordingly.

If a response 922, requesting content recommendation without considering the waiting time for boarding (10 minutes) in addition to the travel time (50 minutes), is selected, an estimated travel time may be calculated as 50 minutes and a recommended content is displayed accordingly.

A recommended content 930 may be selected, taking into account the user's existing content usage history in the user information. The recommended content 930 may have a content length 931 that is suitable for the total estimated travel time (60 minutes) that includes the waiting time for boarding.

Figure 10:
FIG. 10 shows an example in which a message suggesting accelerated playback is provided on a screen when there is insufficient time to view a content according to an embodiment of the present disclosure.

FIG. 10 shows an example in which a message suggesting accelerated playback is provided on a screen when there is insufficient time to watch a content according to an embodiment of the present disclosure.

Referring to FIG. 10, travel information 1010 is displayed on a user terminal 20. The travel information 1010 may include information 1011 about an estimated travel time (18 minutes) based on a current moment and information 1012 about a change in the estimated travel time.

Referring to FIG. 10, a content 1020 in progress may be displayed on the user terminal 20, and a remaining time 1021 of the content may be displayed. If the remaining time 1021 of the content is longer than the estimated travel time, a message 1030 inquiring whether to accelerate a playback speed to finish watching the entire video within the estimated travel time may be displayed, along with response interfaces 1031 and 1032.

Figure 11:
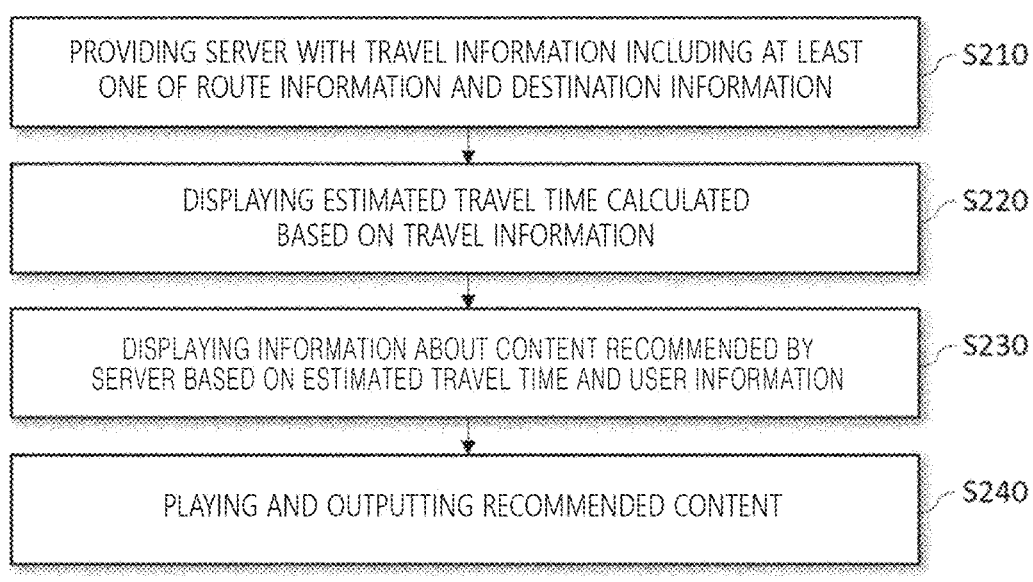
FIG. 11 is a flowchart to explain a method for a user terminal to provide content recommendation based on a user's travel information according to yet another embodiment of the present disclosure.

FIG. 11 is a flowchart illustrating a method in which a user terminal 20 provides content recommendation based on a user's travel information according to yet another embodiment of the present disclosure.

Operations described with reference to FIG. 11 corresponds to the respective operations performed by the server 10 described above with reference to FIG. 2. Therefore, the detailed description of the operations of FIG. 11 will be omitted for simplicity of explanation.

In operation S210, the user terminal 20 provides travel information including at least one of route information and destination information to the server 10. Operation S210 may corresponds to operation S110 described above.

In operation S220, the user terminal 20 displays an estimated travel time calculated based on the travel information. Operation S220 may correspond to operation S120 described above.

In operation S230, the user terminal 20 displays information about a content, which is recommended by the server 10 based on the estimated travel time and user information. Operation S230 may correspond to operation S140 described above.

In operation S240, the user terminal 20 plays and outputs the recommended content. Operation S240 may correspond to a part of operation S140 described above. In operation S240, the user terminal 20 may receive the recommended content from a content server 10 other than the server 10 and displays the recommended content.

In the present disclosure, it is possible to provide a method for content recommendation based on a user's travel information.

In addition, in the present disclosure, it is possible to recommend a customized content tailored to the user's preference and situation, not only based on the user's travel information but also on the user's travel purpose information.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method in which a server recommends a content based on a travel information of a user, the method comprising:

receiving travel information comprising at least one of route information or destination information from a user terminal;

calculating an estimated travel time for the user based on the travel information;

generating travel purpose information of the user based on the destination information or a combination of the destination information and a travel start time of the user;

selecting at least one recommended content based on the travel purpose information, the estimated travel time and user information about the user; and providing information about the at least one recommended content to the user terminal;

wherein different weights are assigned to the user information and the travel purpose information in selecting the at least one recommended content, wherein selecting the at least one recommended content comprises comparing each of the different weights and selecting the at least one recommended content based on a result of the comparison, wherein the user information comprises a preferred content type, the preferred content type being determined based on at least one of:

functional capabilities of the user terminal, including whether the user terminal can reproduce an auditory content, a visual content, or a combination thereof, or a type of wearable AV device, worn by the user and in data communication with the user terminal, the wearable AV device being present while the server provides the information about the at least one recommended content, wherein the generated travel purpose information comprises known travel purpose information and unknown travel purpose information, wherein generating the travel purpose information comprises estimating a travel purpose of the user based on at least one of:

i) the destination information, ii) the combination of the destination information and the travel start time of the user, iii) the route information, or iv) schedule information of the user, wherein the known travel purpose information is generated when the travel purpose of the user is estimable from at least one of items i)-iv), wherein the unknown travel purpose information is generated when the travel purpose of the user is not estimable from any of items i)-iv), and wherein a lower weight is assigned to the unknown travel purpose information than to the known travel purpose information in selecting the at least one recommended content.

2. The method of claim 1, wherein the destination information comprises name information specified by the user terminal for the destination information.

3. The method of claim 1, wherein the user information comprises at least one of the following: the user's content usage history, subscription information, preference information, or preferred content types.

4. The method of claim 1, wherein in selecting the at least one recommended content, the server selects the at least one recommended content also based on a result of comparison of the estimated travel time with length information of at least one content.

5. The method of claim 4, wherein:

the at least one content comprises an interrupted content that is a content which the user watched but didn't complete, and length information of the interrupted content is remaining length information calculated based on an interrupted point of the interrupted content.

6. The method of claim 5, wherein:

providing the information about the at least one recommended content comprises providing the at least one recommended content to the user terminal in response to a playback request for the recommended content from the user terminal, and in response to the interrupted content being selected as the at least one recommended content, the server, in the providing of the at least one recommended content, provides the interrupted content, starting from the interrupted point.

7. The method of claim 1, wherein:

the travel information comprises a call request for a transportation vehicle, and the method further comprises providing the user terminal with assignment information for the transportation vehicle based on the call request.

8. The method of claim 7, further comprising calculating a waiting time for the user to board the transportation vehicle based on the assignment information, wherein in calculating the estimated travel time, the server calculates the estimated travel time by further considering the waiting time.

9. The method of claim 7, further comprising:

calculating the waiting time for the user to board the transportation vehicle based on the assignment information; and inquiring the user terminal about whether to calculate the estimated travel time by further considering the waiting time, wherein in response to a response requesting to calculate the estimated travel time being further based on the waiting time for boarding, the server, in calculating the estimated travel time, calculates the expected time by further considering the waiting time for boarding.

10. The method of claim 1, further comprising:

identifying a change in the estimated travel time; and re-selecting the at least one recommended content by taking into account the change in the estimated travel time.

11. The method of claim 10, further comprising, prior to identifying the change in the estimated travel time, receiving information requesting recalculation of the estimated travel time based on a current moment from the user terminal, wherein in identifying the change in the estimated travel time, the server recalculates the estimated travel time based on a current moment and identifies the change in the estimated travel time by taking into account a result of the recalculation.

12. The method of claim 1, further comprising:

identifying a decrease in the expected travel time; and providing the user terminal with information suggesting a change in a playback speed of the at least one recommended content by taking into account the decrease in the estimated travel time.

13. The method of claim 1, further comprising:

identifying information about a transportation vehicle for the user regarding the travel information; and providing information about the at least one recommended content to at least one of the transportation vehicle and a content output device installed in the transportation vehicle.

14. The method of claim 1, wherein the weights are determined based on conditions set by the user.

15. The method of claim 1, wherein, in response to the wearable AV device being a headphone or earphones, the preferred content type is determined to include an auditory content.

16. The method of claim 1, wherein the travel purpose information comprises a particular sports game, and wherein a matching content comprises a content relating to a video lesson of the sports game.

17. The method of claim 1, wherein the known travel purpose information comprises at least one of exercise, sports, or study.

18. The method of claim 1, further comprising causing the user terminal to display a guidance message that recommends a content based on the estimated travel time and the travel purpose information suggesting that the user watch a specific content that matches the travel purpose information during the calculated estimated travel time.

19. A server for content recommendation based on travel information of a user, the server comprising:

a memory storing instructions; and a processor configured to execute the instructions to:

receive travel information comprising at least one of route information or destination information from a user terminal;

calculate an estimated travel time for the user based on the travel information;

generate travel purpose information of the user based on the destination information or a combination of the destination information and a travel start time of the user;

select at least one recommended content based on the estimated travel time and user information about the user;

provide information about the at least one recommended content to the user terminal; and assign different weights to the user information and the travel purpose information in selecting the at least one recommended content, in selecting the at least one recommended content, the processor configured to compare each of the different weights and select the at least one recommended content based on a result of the comparison, wherein the user information comprises a preferred content type, the preferred content type being determined based on at least one of:

functional capabilities of the user terminal, including whether the user terminal can reproduce an auditory content, a visual content, or a combination thereof, or a type of wearable AV device, worn by the user and in data communication with the user terminal, the wearable AV device being present while the server provides the information about the at least one recommended content, wherein the generated travel purpose information comprises known travel purpose information and unknown travel purpose information, and wherein the processor is configured to:

generate the travel purpose information by estimating a travel purpose of the user based on at least one of: i) the destination information, ii) the combination of the destination information and the travel start time of the user, iii) the route information, or iv) schedule information of the user, generate the known travel purpose information when the travel purpose of the user is estimable from at least one of items i)-iv), generate the unknown travel purpose information when the travel purpose of the user is not estimable from any of items i)-iv), and assign a lower weight to the unknown travel purpose information than to the known travel purpose information in selecting the at least one recommended content.

20. A user terminal for receiving content recommendation based on travel information of a user, the user terminal comprising:

a memory storing instructions; and a processor configured to execute the instructions to:

provide travel information comprising at least one of route information or destination information to a server so that the server generates travel purpose information of the user based on the destination information or a combination of the destination information and a travel start time of the user, assigns different weights to user information about the user and the travel purpose information, compares each of the different weights, and selects a recommended content based on a result of the comparison, wherein the generated travel purpose information comprises known travel purpose information and unknown travel purpose information, cause the server to:

generate the travel purpose information by estimating a travel purpose of the user based on at least one of: i) the destination information, ii) the combination of the destination information and the travel start time of the user, iii) the route information, or iv) schedule information of the user, generate the known travel purpose information when the travel purpose of the user is estimable from at least one of items i)-iv), generate the unknown travel purpose information when the travel purpose of the user is not estimable from any of items i)-iv), and assign a lower weight to the unknown travel purpose information than to the known travel purpose information in selecting the at least one recommended content;

display an estimated travel time that is calculated based on the travel information;

display information about the recommended content received from the server based on the estimated travel time and the user information; and play and output the recommended content, wherein the user information comprises a preferred content type, the preferred content type being determined based on at least one of:

functional capabilities of the user terminal, including whether the user terminal can reproduce an auditory content, a visual content, or a combination thereof, or a type of wearable AV device, worn by the user and in data communication with the user terminal, the wearable AV device being present while the server provides the information about the at least one recommended content.

* * * * *